US012744690B2

(12) United States Patent
Sapio et al.

(10) Patent No.: US 12,744,690 B2
(45) Date of Patent: Sep. 22, 2026

(54) NETWORK SUPPORT FOR RELIABLE MULTICAST OPERATIONS

(71) Applicant: Intel Corporation, Santa Clara, CA (US)

(72) Inventors: Amedeo Sapio, San Jose, CA (US); Daniel A. Alvarez, Oakland, CA (US); Anurag Agrawal, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 46 days.

(21) Appl. No.: 17/552,875

(22) Filed: Dec. 16, 2021

(65) Prior Publication Data

US 2022/0109587 A1 Apr. 7, 2022

(51) Int. Cl.
*H04L 12/18* (2006.01)
*H04L 1/1607* (2023.01)

(52) U.S. Cl.
CPC ........ *H04L 12/1868* (2013.01); *H04L 1/1671* (2013.01)

(58) Field of Classification Search
None
See application file for complete search history.

(56) References Cited

U.S. PATENT DOCUMENTS 6,331,983 B1 12/2001 Haggerty et al.
6,502,140 B1 12/2002 Boivie
6,625,121 B1 9/2003 Lau et al.
6,625,773 B1 9/2003 Boivie et al.
7,065,068 B2 * 6/2006 Ghosh .................. H04L 1/1803 370/428
7,075,904 B1 7/2006 Manish et al.
7,571,259 B2 8/2009 Pong
7,936,753 B1 * 5/2011 Colloff .................... H04L 45/16 370/390
7,969,980 B1 6/2011 Florit et al.
7,987,229 B1 7/2011 Kinne et al.
9,588,928 B1 3/2017 Swartzentruber
(Continued)

FOREIGN PATENT DOCUMENTS

CN 110401599 A 11/2019
EP 3531633 A1 8/2019
WO 2015021822 A1 2/2015

OTHER PUBLICATIONS

European First Office Action, (EP Exam Report Article 94(3) EPC), for Patent Application No. 21196829.2, Mailed Oct. 24, 2023, 4 pages.

(Continued)

*Primary Examiner* — Willie J Daniel, Jr.
(74) *Attorney, Agent, or Firm* — Compass IP Law PC

(57) ABSTRACT

Examples described herein relate to a switch circuitry that includes circuitry to cause transmission, to multiple destinations, of copies of a packet received from a sender network interface device and circuitry to indicate acknowledgement of packet receipt, from the multiple destinations, to the sender network interface device based on receipt of acknowledgements of packet receipt from the multiple destinations. In some examples, the circuitry is to indicate acknowledgement of packet receipt, from the multiple destinations, to the sender network interface device with a packet index value.

17 Claims, 11 Drawing Sheets

(56) References Cited

U.S. PATENT DOCUMENTS

| | | | |
|---|---|---|---|
| 9,959,227 | B1 | 5/2018 | Diamant et al. |
| 10,719,238 | B1 | 7/2020 | Espy et al. |
| 11,231,987 | B1 | 1/2022 | Bose et al. |
| 11,601,515 | B2 * | 3/2023 | Butcher ............ H04W 28/0804 |
| 11,757,764 | B2 * | 9/2023 | Bataineh ................. H04L 69/40 370/351 |
| 12,381,751 | B2 | 8/2025 | Sen et al. |
| 2001/0021949 | A1 | 9/2001 | Blightman et al. |
| 2002/0029281 | A1 | 3/2002 | Zeidner et al. |
| 2002/0041594 | A1 | 4/2002 | Suzuki et al. |
| 2002/0114030 | A1 | 8/2002 | Dwivedi et al. |
| 2005/0081080 | A1 | 4/2005 | Bender et al. |
| 2005/0216642 | A1 | 9/2005 | Lee |
| 2005/0238035 | A1 | 10/2005 | Riley |
| 2006/0075057 | A1 | 4/2006 | Gildea et al. |
| 2006/0101225 | A1 | 5/2006 | Aloni et al. |
| 2008/0005512 | A1 | 1/2008 | Narayanasamy et al. |
| 2009/0006666 | A1 | 1/2009 | Chen et al. |
| 2011/0035459 | A1 | 2/2011 | Desai et al. |
| 2011/0072234 | A1 | 3/2011 | Chinya et al. |
| 2011/0173396 | A1 | 7/2011 | Sugumar et al. |
| 2013/0232284 | A1 | 9/2013 | Akiyama et al. |
| 2014/0092678 | A1 | 4/2014 | Feekes |
| 2014/0269271 | A1 | 9/2014 | Gafni et al. |
| 2014/0297775 | A1 | 10/2014 | Davda et al. |
| 2015/0006663 | A1 | 1/2015 | Huang et al. |
| 2015/0092539 | A1 | 4/2015 | Sivabalan et al. |
| 2015/0134891 | A1 | 5/2015 | Jo |
| 2015/0293881 | A1 | 10/2015 | Raikin et al. |
| 2016/0077966 | A1 | 3/2016 | Stabrawa et al. |
| 2016/0267053 | A1 | 9/2016 | Sharp et al. |
| 2016/0306744 | A1 | 10/2016 | Kampe et al. |
| 2017/0041157 | A1 | 2/2017 | Zheng |
| 2017/0075856 | A1 | 3/2017 | Suzue et al. |
| 2018/0176324 | A1 | 6/2018 | Kumar et al. |
| 2018/0181330 | A1 | 6/2018 | Kusters et al. |
| 2018/0239726 | A1 | 8/2018 | Wang et al. |
| 2018/0329841 | A1 | 11/2018 | Maeda |
| 2019/0114102 | A1 | 4/2019 | Chen |
| 2019/0123922 | A1 | 4/2019 | Suthar et al. |
| 2019/0220384 | A1 | 7/2019 | Ying et al. |
| 2019/0278676 | A1 | 9/2019 | Zou et al. |
| 2019/0297015 | A1 | 9/2019 | Marolia et al. |
| 2019/0313275 | A1 | 10/2019 | Chen et al. |
| 2019/0334836 | A1 | 10/2019 | Ajima et al. |
| 2019/0394127 | A1 | 12/2019 | Gerhart et al. |
| 2020/0004685 | A1 | 1/2020 | Bernat et al. |
| 2020/0019521 | A1 | 1/2020 | Solanki et al. |
| 2020/0021492 | A1 | 1/2020 | Ganguli et al. |
| 2020/0042358 | A1 | 2/2020 | Sun et al. |
| 2020/0104275 | A1 | 4/2020 | Sen et al. |
| 2020/0133909 | A1 | 4/2020 | Hefty et al. |
| 2020/0136996 | A1 | 4/2020 | Li et al. |
| 2020/0210360 | A1 | 7/2020 | Reghunath et al. |
| 2020/0296057 | A1 | 9/2020 | Mula et al. |
| 2020/0326889 | A1 | 10/2020 | Norman et al. |
| 2020/0349074 | A1 | 11/2020 | Kucherov et al. |
| 2021/0073151 | A1 | 3/2021 | Sen et al. |
| 2021/0075633 | A1 | 3/2021 | Sen et al. |
| 2021/0374073 | A1 | 12/2021 | Gugnani et al. |
| 2022/0035736 | A1 | 2/2022 | Chiang |
| 2022/0091754 | A1 | 3/2022 | Raman et al. |

OTHER PUBLICATIONS

First Office Action for U.S. Appl. No. 17/103,711, Mailed Feb. 15, 2024, 10 pages.

First Office Action for U.S. Appl. No. 17/103,802, Mailed Feb. 15, 2024, 11 pages.

"9.2.Performing Direct Memory Access (DMA) transactions", Jungo Connectivity, WinDriver™ PCI/ISA User's Manual, Version 14.4.0, Chapter 9. Advanced Issues, https://www.jungo.com/st/support/documentation/windriver/14.4.0/wdpci_manual.mhtml/advanced_issues_dma_transaction.html, Copyright 2020 Jungo Connectivity Ltd., 14 pages.

"Chapter 9 Direct Memory Access (DMA)", Oracle, https://docs.oracle.com/cd/E19120-01/open.solaris/819-3196/6n5ed4h06/index.html, © 2010 Oracle Corporation, 25 pages.

"Direct Memory Access", ScienceDirect, https://www.sciencedirect.com/topics/computer-science/direct-memory-access, downloaded from the internet Oct. 11, 2022, 17 pages.

"RDMA Aware Networks Programming User Manual Rev 1.7", Mellanox Technoloiges, www.mellanox.com, Jun. 15, 2015, 216 pages.

"Rdma_cm(7)—Linux man page", die.net, https://linux.die.net/man/7/rdma_cm, downloaded from the internet Oct. 11, 2022, 6 pages.

"The GigaIO FabreX Memory Fabric Memory Pooling Overview", GIGAIO Technical Paper, Feb. 2020 | Rev 1.0, 8 pages.

Baker, Art, et al., "Writing a Packet-Based Slave DMA Driver", Oreilly, Windows 200 Device Driver Book: A Guide for Programmers, Second Edition, https://www.oreilly.com/library/view/windows-2000-device/0130204315/0130204315_ch12lev1sec3.html, Nov. 20, 2000, 2 pages.

Deierling, Kevin, "What Is a DPU? . . . and what's the difference between a DPU, a CPU and a GPU?", Nvidia, https://blogs.nvidia.com/blog/2020/05/20/whats-a-dpu-data-processing-unit/, May 20, 2020, 5 pages.

Dittia, Zubin D., et al., "DMA Mechanisms for High Performance Network Interfaces", Washington University in St. Louis, Nov. 4, 2007, 15 pages.

Extended European Search Report for Patent Application No. 21196829.2, Mailed Mar. 3, 2022, 7 pages.

Extended European Search Report for Patent Application No. 21198323.4, Mailed Mar. 21, 2022, 7 pages.

Goodwins, Rupert, "How direct memory access speeds Ethernet", ZDNET, https://www.zdnet.com/article/how-direct-memory-access-speeds-ethernet/, May 1, 2003, 3 pages.

International Search Report and Written Opinion for PCT Patent Application No. PCT/US21/51357, Mailed Jan. 6, 2022, 11 pages.

International Search Report and Written Opinion for PCT Patent Application No. PCT/US21/51797, Mailed Jan. 3, 2022, 11 pages.

Jiang, Dave, "Introducing the Intel® Data Streaming Accelerator (Intel® DSA)", Intel Open Source.org, https://01.org/blogs/2019/introducing-intel-data-streaming-accelerator , Nov. 20, 2019, 6 pages.

Kauffmann, Antoine, et al., "FlexNIC: Rethinking Network DMA", University of Washington, Apr. 20, 2015, 7 pages.

MPI, "4.1 Introduction and Overview", https://www.mpi-forum.org/docs/mpi-1.1/mpi-11-html/node64.html, MPI-1.1, Jun. 1995, 4 pages.

First Office Action for U.S. Appl. No. 17/103,602, Mailed Jan. 3, 2024, 18 pages.

First Office Action for U.S. Appl. No. 17/103,674, Mailed Jan. 3, 2024, 16 pages.

European Second Office Action, (EP Exam Report Article 94(3) EPC), for Patent Application No. 21198323.4, Mailed Sep. 16, 2024, 5 pages.

Final Office Action for U.S. Appl. No. 17/103,674, Mailed Aug. 14, 2024, 19 pages.

European First Office Action, (EP Exam Report Article 94(3) EPC), for Patent Application No. 21198323.4, Mailed Aug. 2, 2023, 5 pages.

First Office Action for U.S. Appl. No. 17/103,781, Mailed Dec. 18, 2023, 19 pages.

Method and apparatus for implementing reliable multicast in overlay network ED—Darl Kuhn 11, ip.com, ip.com Inc., West Henrietta, NY, US, Mar. 9, 2015 (Mar. 9, 2015), *the whole document*, 15 pages.

Extended European Search Report for Patent Application No. 21895303.2, Mailed Sep. 10, 2024, 8 pages.

Notice of Allowance for U.S. Appl. No. 17/103,711, Mailed Sep. 4, 2024, 10 pages.

Notice of Allowance for U.S. Appl. No. 17/103,781, Mailed Mar. 21, 2025, 17 pages.

European First Office Action, (EP Exam Report Article 94(3) EPC), for Patent Application No. 21895303.2, Mailed Dec. 16, 2025, 4 pages.

(56) References Cited

OTHER PUBLICATIONS

Bryson, Kristin, "Nvidia Introduces New Family of BlueField DPUs to Bring Breakthrough Networking, Storage and Security Performance to Every Data Center", Enterprise Data Center, nvidia Newsroom, Oct. 5, 2020, 3 pages.
European Third Office Action, (EP Exam Report Article 94(3) EPC), for Patent Application No. 21198323.4, Mailed Dec. 4, 2025, 6 pages.
First Office Action for U.S. Appl. No. 18/999,934, Mailed Mar. 6, 2026, 15 pages.

* cited by examiner

| Index | 0 | 1 | 2 |
|---|---|---|---|
| Version | 0 | 0 | 0 |

| Index | 0 | 1 | 2 |
|---|---|---|---|
| Version | 1 | 0 | 0 |

| Index | 0 | 1 | 2 |
|---|---|---|---|
| Version | 1 | 1 | 0 |

| Index | 0 | 1 | 2 |
|---|---|---|---|
| Version | 1 | 1 | 1 |

| Index | 0 | 1 | 2 |
|---|---|---|---|
| Version | 1 | 0 | 1 |

| Index | 0 | 1 | 2 |
|---|---|---|---|
| Version | 1 | 0 | 0 |

| Index | 0 | 1 | 2 |
|---|---|---|---|
| Version | 0 | 0 | 0 |

| Index | 0 | 1 | 2 |
|---|---|---|---|
| Version | 1 | 1 | 1 |

NETWORK SUPPORT FOR RELIABLE MULTICAST OPERATIONS

Collective operations are common building blocks of distributed applications that are used to synchronize and/or share data among multiple collaborating processes (or nodes) connected through a packet-switched network. The data can be split in multiple portions, so that a portion can fit in a single packet payload. A set of processes that share data through collective operations are gathered in a Collective Group.

Example collective operations include multicast, broadcast, and Allgather. The multicast or broadcast operation can send data from a process (e.g., source) to other processes in the group. With the Allgather operation, processes in a group send data to other processes whereby N processes, at different source nodes, perform N broadcast operations. Senders sending multiple copies of the same data to different recipients can limit scalability as the time taken for a packet transmit operation increases as the number of recipients grows.

DETAILED DESCRIPTION

In connection with reliable delivery of packets to endpoint recipients, endpoint recipients can send acknowledgement packets back to the source to confirm packet receipt (e.g., using Transmission Control Protocol (TCP) and a sequence number). Acknowledgement packets can carry the identifier (ID) of the data packet for which reception is confirmed. Packets can be combined to send a single acknowledgement packet to confirm the receipt by the same recipient of multiple packets. A sender can re-transmit the data in case the sender does not receive an acknowledgement after a pre-defined amount of time. If one data packet or acknowledgement packet is lost during the transmission (e.g., dropped by the device because of corruption or congestion), the timer in the source triggers the transmission of a replica of the packet.

Some switches perform packet replication of a single copy of a data packet received from a sender network interface device. In this case, a switch is programmed to receive a single packet from the sender network interface device and forward the single packet to recipients in a group. The packet can be tagged with a packet group identifier, which is used by the switch to identify the group of recipients to which a packet is sent and who are the recipients for that packet. The switch, which duplicates a packet content, in part, and sends the packet content to multiple recipients, can support reliability in the presence of packet losses by tracking received acknowledgements and after acknowledgements have been received from recipients, the switch can send a confirmation that recipients received the packet to the sender network interface device. Examples can be used for packet broadcast and Allgather operations, and any case where reliable network multicast is to be used. Thus, the server can offload processing of acknowledgements to a switch and reduce server load.

Figure 1:
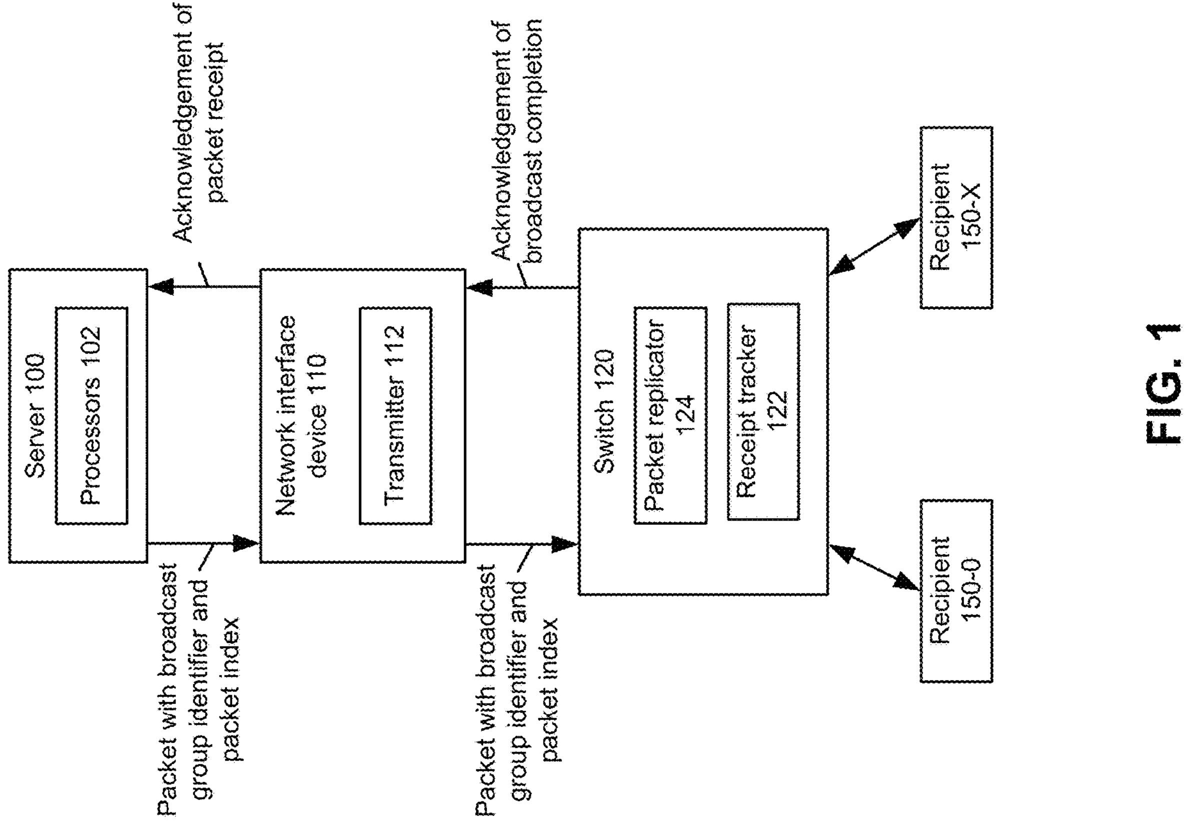
FIG. 1 depicts an example system.

FIG. 1 depicts an example system. Server 100 can include or access one or more processors 102, memory devices, and device interfaces, among other components described herein (e.g., accelerator devices, interconnects, and other circuitry). Examples of components of server are described herein at least with respect to FIG. 9. Processors 102 and/or accelerator devices can execute one or more applications (e.g., microservices, virtual machines (VMs), containers, or other distributed or virtualized execution environments) that request transmission of packets or process packets received by network interface device 110. The application can request transmission of a packet to nodes of a broadcast group in connection with a collective operation such as Allgather or Allreduce. A node can include a computing platform with one or more of: a network interface device and/or computing platform (e.g., CPU, GPU, accelerator, memory, storage, and so forth). In some examples, one or more of processors 102 can execute a driver to configure transmitter 112 of network interface device 110 to mark a packet for transmission to multiple destination devices and/or indicate that switch 120 can reuse a data structure that tracks acknowledgements of receipt, as described herein. Various examples of switch 120 include one or more of: a forwarding element, a router, a network interface device configured to receive and forward packets, an infrastructure processing unit (IPU), a data processing unit (DPU), and so forth.

Referring to network interface device 110, transmitter 112 can select a packet for transmission to switch 120 and indicate that switch 120 is to transmit the packet to one or more destination devices (e.g., one or more of recipients 150-0 to 150-X, where X is 1 or more). For example, network interface device 110 can send a packet to switch 120 with an identifier, in one or more header fields, of a group of nodes that are a broadcast group and request broadcast of the packet. Switch 120 can be configured by an orchestrator or by network interface device 110 to associate destination addresses (e.g., IP addresses, MAC addresses, destination ports, or queues) with the identifier of a broadcast or multicast group. Switch 120 can utilize packet replicator 124 to copy portions of a packet that switch 120 is to transmit to multiple destinations.

In some examples, server 100, network interface device 110, and switch 120 can perform a handshake operation where server 100 and switch 120 agree that switch 120 is to perform packet replication for specified recipient devices. A group of recipients can be identified using a group identifier value transmitted to switch 120 with a packet to be replicated or prior to the packet to be replicated.

Switch 120 can keep track of delivery of the packet to one or more of recipients 150-0 to 150-X. Switch 120 can utilize a data structure (e.g., bitmap) that indicates whether delivery has been completed for the packet to one or more of recipients 150-0 to 150-X. For example, after receipt of an acknowledgement (ACK) from a recipient in a group of nodes, receipt tracker 122 can identify in the data structure that the packet was received by a particular recipient in a group of nodes.

Based on receipt of acknowledgement of receipt by all recipients in the group of nodes, receipt tracker 122 can inform network interface device 110 that receipt of the packet was acknowledged by recipients in the group of nodes. However, in some examples, if receipt tracker 122 does not indicate acknowledgement of receipt by all recipients in the group of nodes to network interface device 110 within a threshold amount of time from transmission of the packet from network interface device 110 to switch 120, network interface device 110 can retransmit the packet again to switch 120 with a broadcast group identifier and switch 120 can transmit the packet to the recipient that did not acknowledge receipt of the packet. In some examples, a process executed by processor 102 that requested broadcast of the packet and network interface device 110 does not track which destination device did not provide an acknowledgement of receipt and instead switch 120 can manage reliable transport of the packet to the destination devices of the broadcast group.

Based on server 100 and/or network interface device 110 not receiving an acknowledgement of packet receipt by the broadcast or multicast destinations in a group after a specified amount of time, server 100 and/or network interface device 110 can cause the packet to be sent to switch 120 and switch 120 can re-transmit the packet to the destination device from which acknowledgement of receipt was not received by switch 120.

In some cases, for a packet that is to be transmitted to multiple nodes of a broadcast group, switch 120 can send an acknowledgement of receipt to network interface device 110 to indicate multiple nodes of a broadcast group have acknowledged receipt of the packet in response to switch 120 receiving acknowledgement of receipt from the multiple nodes of a broadcast group. For example, the acknowledgement of receipt can identify a packet index value, which can correspond to a node of the multiple nodes, and a version value, which can identify a data structure that is used to track received acknowledgments from recipient nodes of a broadcast group. However, where an acknowledgement sent from switch 120 to network interface device 110 is lost or dropped, switch 120 can resend a previously sent acknowledgment with a same packet index value and version value.

After network interface device 110 receives the group of packet index values for a particular version value in acknowledgements from switch 120, network interface device 110 can reuse a packet index value, but with a different version value and switch 120 can reuse a data structure, but with a different version value, to track packet receipt for the packet index values.

Figure 2:
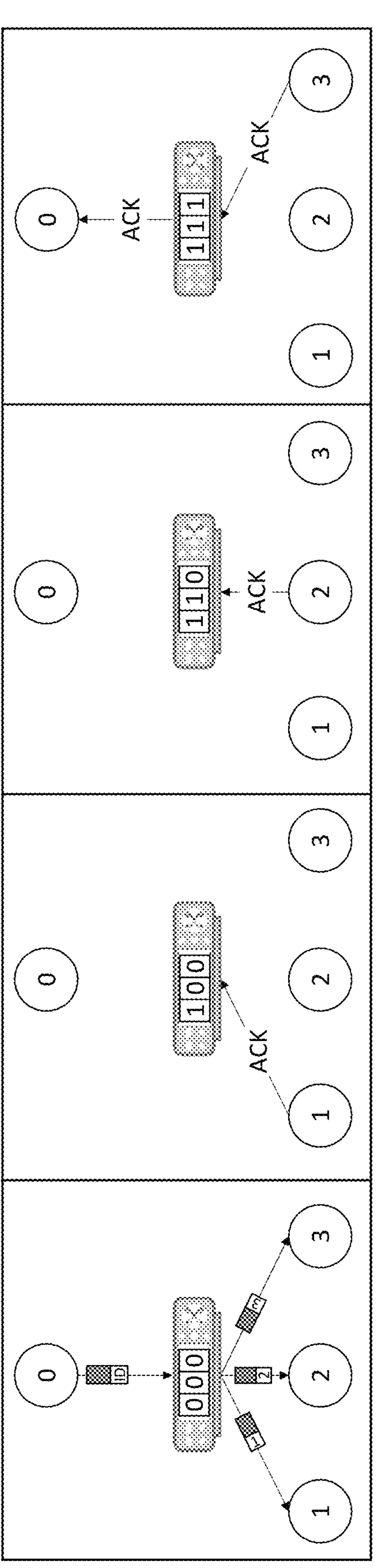
FIG. 2 depicts an example system.

FIG. 2 depicts an example operation. A switch tracks acknowledgements and directs retransmissions to recipients that have not yet confirmed packet receipt. In order to keep track of acknowledgements for packets sent, the switch marks the arrival of an acknowledgement in an internal data structure (e.g., a bitmap). After the packet sent by the source has been replicated and sent to all the recipients, one or more recipients sends an acknowledgement back to the switch. The switch marks this receipt for a recipient in a data structure. After the recipients in a group of recipients have sent acknowledgements, the switch sends an acknowledgement packet to the source to confirm that all the recipients in the group received the packet. In some examples, after confirmation of receipt from all the recipients in the group, the source device can transmit a next packet to the switch to broadcast or transmit to another device. The data structure can be reused to identify acknowledgements of receipt of a second packet by recipients, where the recipients can be the same as those associated with a prior use of the data structure, or different but overlapping with recipients associated with a prior use of the data structure.

Figure 3:
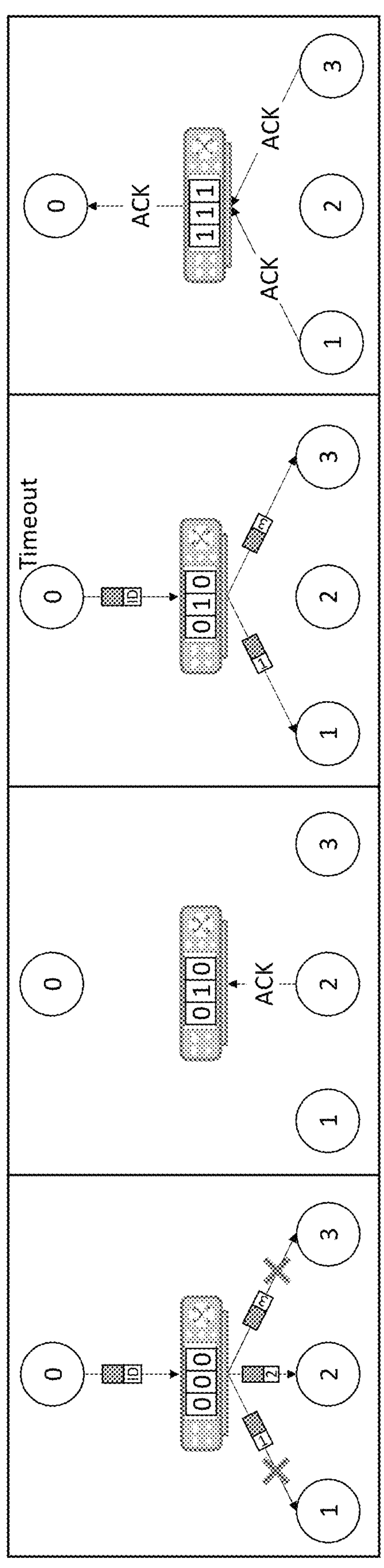
FIG. 3 depicts an example operation.

FIG. 3 depicts an example operation. In some examples, if the source does not receive the acknowledgement packet within a pre-defined amount of time (e.g., larger than an end-to-end round-trip time (RTT) or another threshold amount of time), the source can send a replica of the packet again to the switch to send to the recipient that did not send an acknowledgement of receipt. In some examples, in case the replica is dropped after processed by the switch but before reaching the intended recipient(s) and the source does not receive an acknowledgement, the source can send another replica packet after the pre-defined amount of time. The switch can re-transmit the replica packet to the one or more recipients, from which acknowledgement of packet receipt was not received, according to the data structure identifying which recipient in a group did not acknowledge packet receipt. In some examples, the switch can store the packet for which retransmission was not acknowledged by all recipients in the group and the switch can retransmit the stored packet to the recipient(s) that did not receive the packet.

If an acknowledgment packet from a recipient is dropped before it reaches the switch, the switch does not send the acknowledgment to the source, and the source re-transmits a replica of the packet to the switch. The switch replicates and forwards the packet to recipient(s) that were identified to not have acknowledged receipt of the packet. In a case one or more recipients receive multiple copies of the packet, and the recipient can identify that the packet is a copy of an already received packet by the packets having a same packet sequence number (PSN). However, a recipient can send acknowledgements for two or more of the replica packets to the switch. As a result, even in the case of a dropped acknowledgement that does not reach a switch, the switch receives an acknowledgement and provides an indication to the source that all recipients in a group received the packet.

Figure 4:
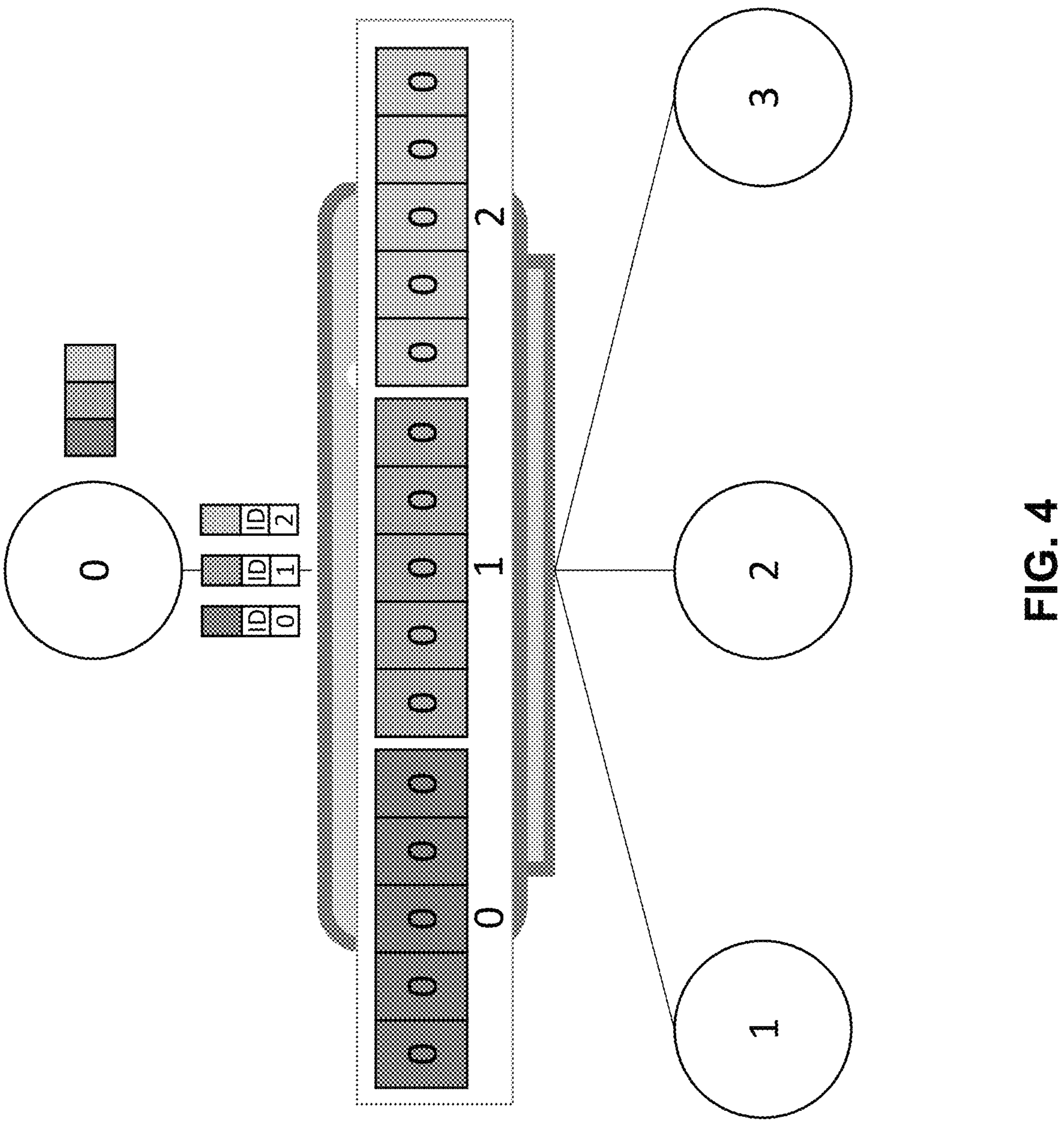
FIG. 4 depicts an example operation showing use of an index.

FIG. 4 depicts an example operation showing use of an index. In some examples, the source can send up to a number N of non-acknowledged packets to the switch for transmission to one or more recipient devices, where N is an integer or 1 or more. The switch can store and utilize a data structure to keep track of acknowledgements received from recipient devices of the N packets. Note that the value N can be independent of a number of recipients and can be a different number than the number of recipients. The value N can be based on a congestion window size. In some examples, a packet from the source can include, in one or more header fields, an index field with a number in the range [0, N−1]. The index can be used by the switch to map the packet to a data structure to track receipt of acknowledgement packets from recipients of the packet. In some examples, the switch can transmit a packet with an index value, in at least one header field, in the range [0, N−1]. In some examples, the acknowledgement packets can include corresponding index values identifying the packet whose receipt was acknowledged. Acknowledgement packets can include the index field value of the packet and associated index for which receipt is confirmed.

The switch can reuse a packet receipt acknowledgement data structure associated with an index number for another packet transmission after receipt of the acknowledgement(s) from the one more packets in a group of recipients. The data structure can be re-used to track receipt of the acknowledgement(s) of another packet from the same group of recipients or a different group of recipients as that associated with the data structure in a prior use of the data structure to track packet receipt acknowledgements.

In some examples, one or more packets can include a version value field (e.g., one or more bits), which can identify one of multiple values. In some examples, the value in the version value can be flipped when a certain index value is to be reused. A change in the version value can lead to re-use of a data structure to track packet receipt acknowledgements.

Figure 5:
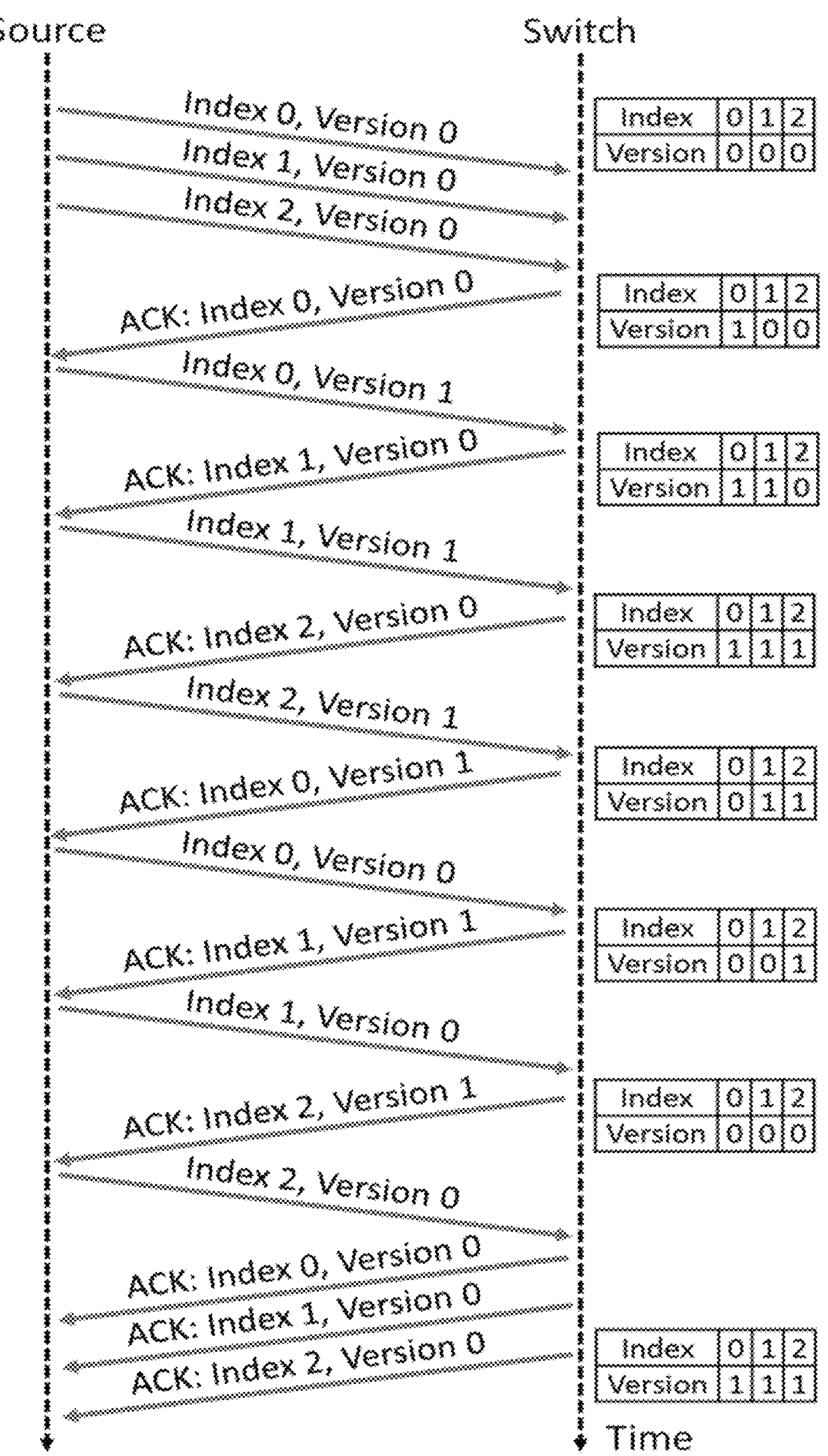
FIG. 5 depicts an example behavior for acknowledgements sent from a network device to a source device.

FIG. 5 depicts an example behavior for acknowledgements sent from a network device to a source device. A version bit field can be used to identify an acknowledgement sent from the switch to the source is dropped or lost before reaching the source. The switch stores, for one or more index values, an expected value for the version value. The switch changes the version value in memory when it sends the acknowledgement back to source, to mark that it is expecting a new packet with a new version value, since the previous one was completely acknowledged by the recipients in the group. An index value can be reused but with a different version value that used immediately prior.

In the example of FIG. 5, three index values (0 to 2) are used and two version values are used for the index values, but more than two version values can be available for use. When the switch receives a data packet, the switch checks the version bit value in the packet against the expected version bit stored in memory. If the two version bit values match, the packet was not previously provided by the source device to the switch, and the switch replicates the packet and sends the replica packets with header fields updated to be sent to the recipient(s). The switch can clear the data structure tracking the received acknowledgements to mark that no acknowledgement has been received from a recipient.

If a version bit value does not match an expected value, then the received packet is a retransmission from the source because an acknowledgement sent to the source was dropped or lost and the switch may not propagate the data packet further but sends, to the source, a copy of a previously transmitted acknowledgement packet that was dropped or lost.

Figure 6:
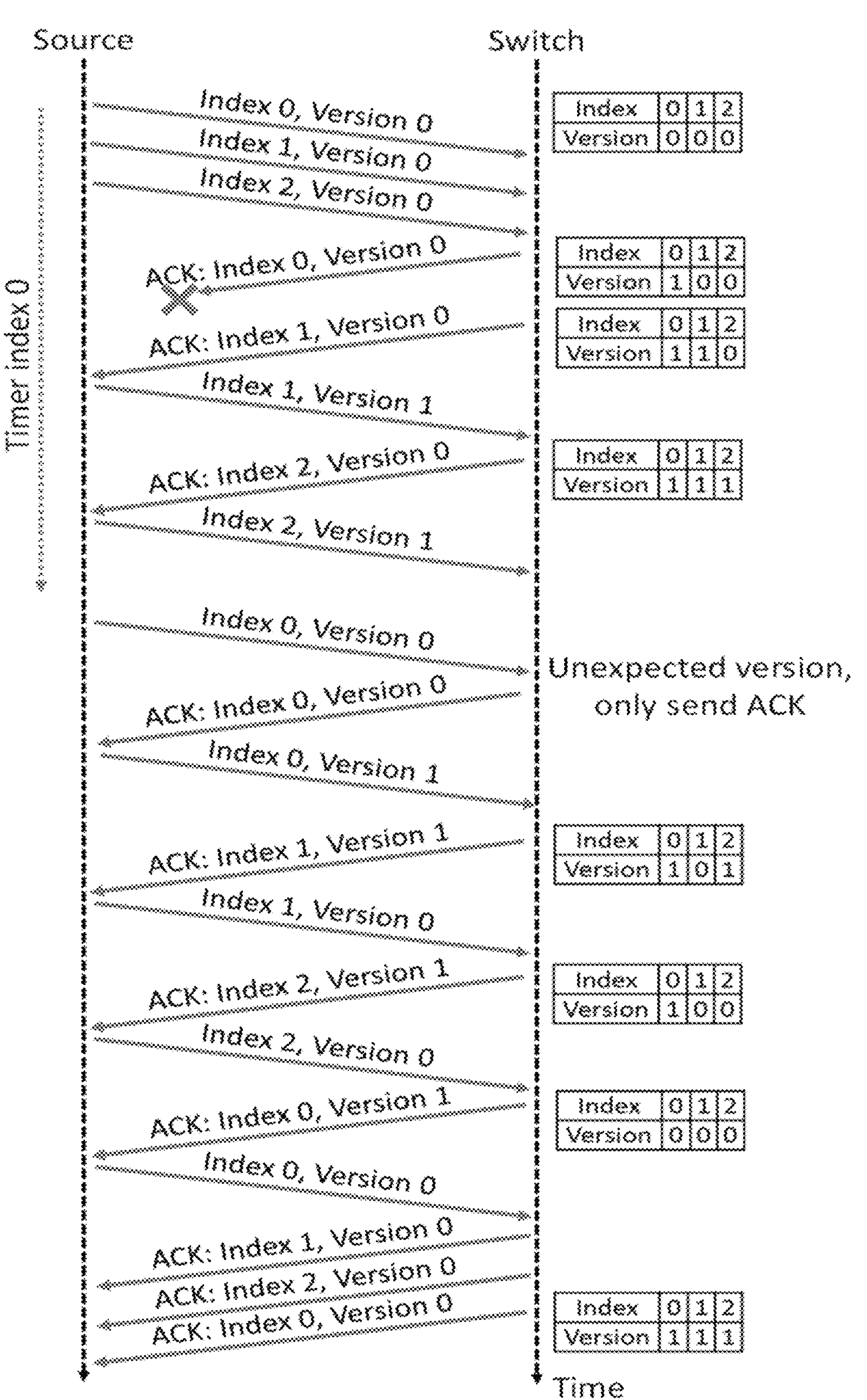
FIG. 6 shows an example behavior of a network interface device.

FIG. 6 shows an example behavior of a switch. In this case, an acknowledgement packet for index 0, version 0 sent from the switch to the source is lost between the device and the source. Based on receipt of another packet with index 0 and version 0, the switch identifies that the acknowledgement of receipt of the packet with index 0 and version 0 was not received by the switch, and the switch re-transmits the acknowledgement packet for index 0, version 0 to the switch. After an acknowledgement for index 0 and version 0 is received by the source, the source can reuse index 0 but with a version value of 1 for a second packet to identify that a data structure can be reused to track receipt acknowledgements for the second packet with index 0 and version 1. The second packet can be sent to the same or different destination devices as that of the packet associated with index 0 and version 0.

Figure 7A:
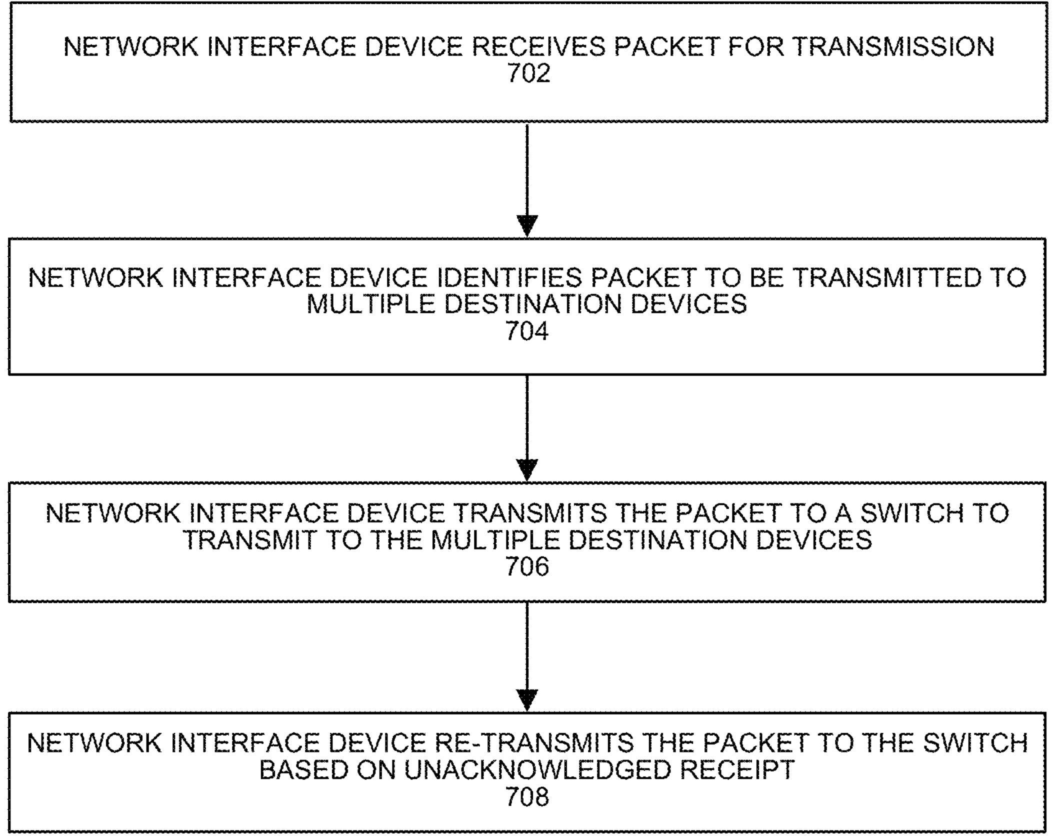
FIG. 7A depicts an example process.

FIG. 7A depicts an example process. At 702, a network interface device can receive a packet that is to be transmitted. The packet can be identified using a descriptor that specifies a broadcast group identifier and address in memory that stores the packet. At 704, the network interface device can identify the packet to be transmitted to multiple destination devices. For example, the packet can be associated with a particular broadcast group identifier that identifies destination IP addresses of the multiple destination devices. At 706, the network interface device can transmit the packet to a switch for transmission to the multiple destination devices. For example, the packet can include, in one or more header fields, one or more of: a packet index value within a broadcast group, a broadcast group identifier, and version value. At 708, based on non-receipt of an acknowledgement for the packet from a destination within the broadcast group within a threshold amount of time, the network interface device can re-transmit the packet to the switch. After receipt of acknowledgements for packet index values of a broadcast group and a particular version number, the network interface device can reuse same packet index values but with a different version number (e.g., toggled version number) to identify another packet.

Figure 7B:
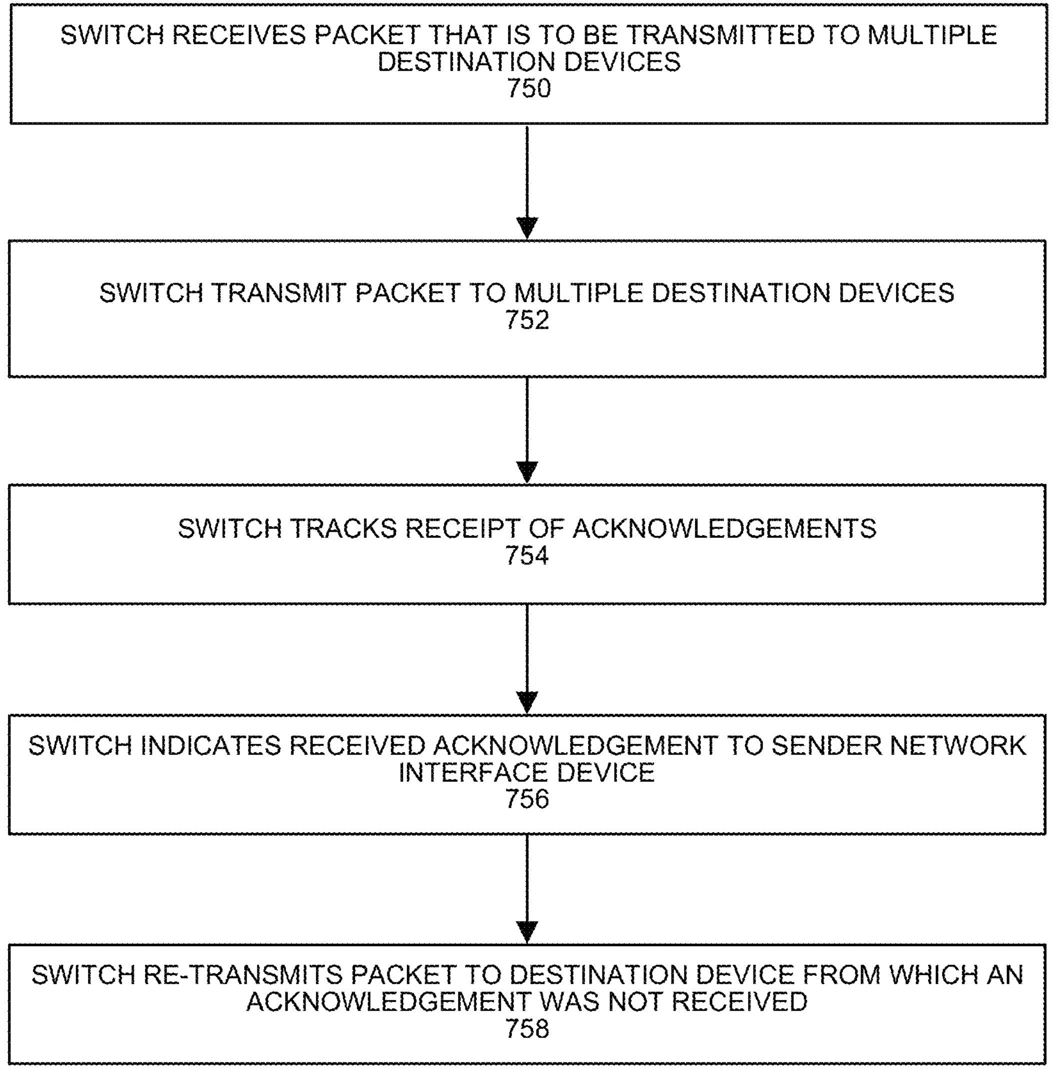
FIG. 7B depicts an example process.

FIG. 7B depicts an example process. At 750, a switch can receive a packet that is to be transmitted to multiple destination devices. The packet can be received from a network interface device. The packet can include, in one or more header fields, one or more of: a packet index value within a broadcast group, a broadcast group identifier, and version value. At 752, the switch can transmit the packet to the multiple destination devices. The multiple destination devices can be associated with broadcast group identifier. At 754, the switch can identify an indication of packet receipt based on acknowledgement of receipt for one of the multiple destination devices. The identification of packet receipt can be marked in a data structure associated with a version number and a broadcast group. In some examples, the data structure can be reused when a second packet is received from the sender network interface device with different version number but with a previously provided packet index value. Note that the switch can be used by different sender network interface devices to perform broadcast or multicast of packets.

At 756, based on receipt of the acknowledgement of receipt from the multiple destination devices, the switch can indicate an acknowledgement of receipt by the multiple destination devices to the sender network interface device. The switch can identify the packet index value within a broadcast group and version number to the sender network interface device. At 758, based on receipt of a packet to be re-transmitted from the sender network interface device, the switch can retransmit the packet, received from the sender network interface device, to the destination device(s) from which the switch did not receive an acknowledgement of receipt within a threshold amount of time.

Figure 8A:
FIG. 8A depicts an example network interface device.
Figure 8A:
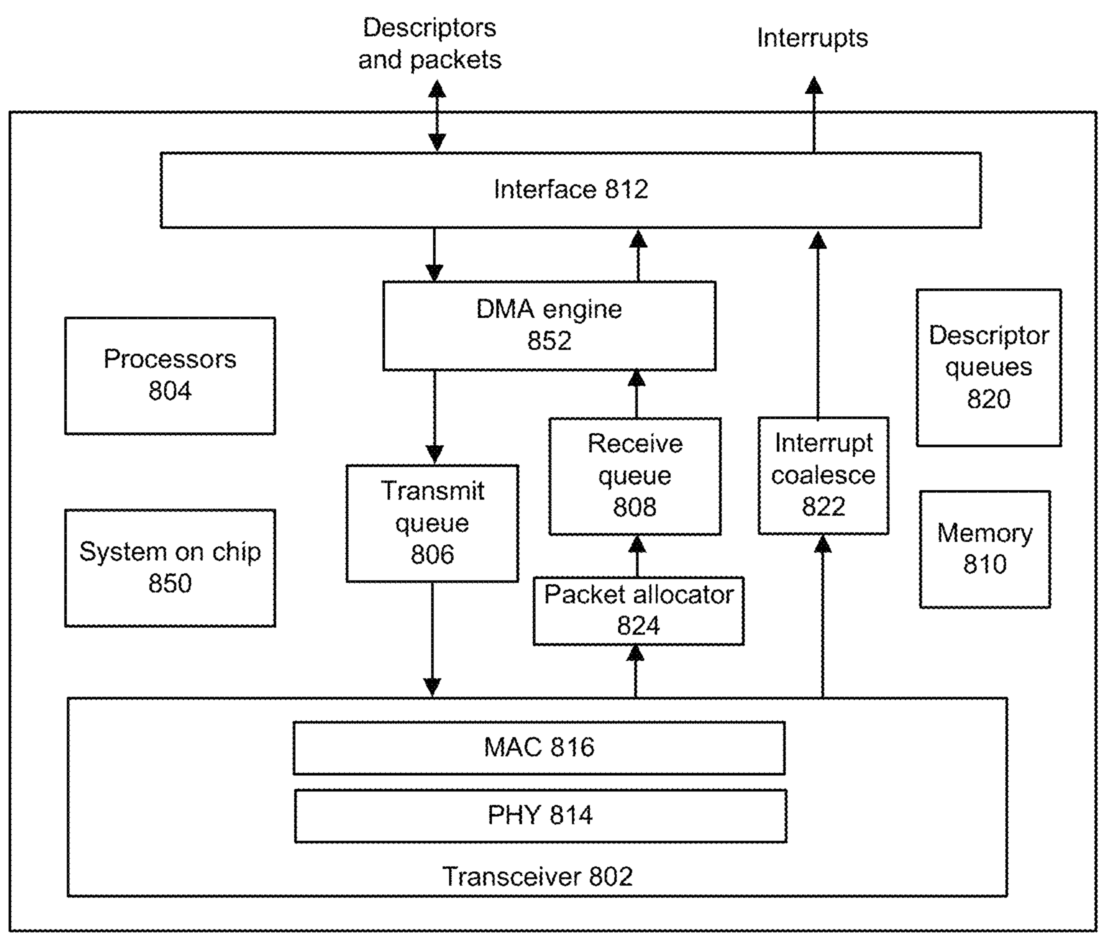

FIG. 8A depicts an example network interface device. The network interface device can include processors to perform packet receipt tracking and acknowledgments of packet receipt of a packet in a broadcast or multicast group to another network interface device, as described herein. In some examples, network interface 800 and a switch can perform a handshake operation so that the switch performs replication of packet content and manages acknowledgement receipt from destination devices. Network interface 800 can include transceiver 802, processors 804, transmit queue 806, receive queue 808, memory 810, and bus interface 812, and DMA engine 852. Transceiver 802 can be capable of receiving and transmitting packets in conformance with the applicable protocols such as Ethernet as described in IEEE 802.3, although other protocols may be used. Transceiver 802 can receive and transmit packets from and to a network via a network medium (not depicted). Transceiver 802 can include PHY circuitry 814 and media access control (MAC) circuitry 816. PHY circuitry 814 can include encoding and decoding circuitry (not shown) to encode and decode data packets according to applicable physical layer specifications or standards. MAC circuitry

816 can be configured to assemble data to be transmitted into packets, which include destination and source addresses along with network control information and error detection hash values.

Processors 804 can be any a combination of a: processor, core, graphics processing unit (GPU), field programmable gate array (FPGA), application specific integrated circuit (ASIC), or other programmable hardware device that allow programming of network interface 800. For example, a "smart network interface" can provide packet processing capabilities in the network interface using processors 804. Configuration of operation of processors 804, including its data plane, can be programmed using Programming Protocol-independent Packet Processors (P4), C, Python, Broadcom Network Programming Language (NPL), or x86 compatible executable binaries or other executable binaries. Processors 804 can execute instructions to perform packet receipt tracking and acknowledgments of packet receipt of a packet in a broadcast group to another network interface device, as described herein. System on chip 850 can include microprocessors that execute instructions to perform packet receipt tracking and acknowledgments of packet receipt of a packet in a broadcast group to another network interface device, as described herein.

Packet allocator 824 can provide distribution of received packets for processing by multiple CPUs or cores using timeslot allocation described herein or RSS. When packet allocator 824 uses RSS, packet allocator 824 can calculate a hash or make another determination based on contents of a received packet to determine which CPU or core is to process a packet.

Interrupt coalesce 822 can perform interrupt moderation whereby network interface interrupt coalesce 822 waits for multiple packets to arrive, or for a time-out to expire, before generating an interrupt to host system to process received packet(s). Receive Segment Coalescing (RSC) can be performed by network interface 800 whereby portions of incoming packets are combined into segments of a packet. Network interface 800 provides this coalesced packet to an application.

Direct memory access (DMA) engine 852 can copy a packet header, packet payload, and/or descriptor directly from host memory to the network interface or vice versa, instead of copying the packet to an intermediate buffer at the host and then using another copy operation from the intermediate buffer to the destination buffer.

Memory 810 can be any type of volatile or non-volatile memory device and can store any queue or instructions used to program network interface 800. Transmit queue 806 can include data or references to data for transmission by network interface. Receive queue 808 can include data or references to data that was received by network interface from a network. Descriptor queues 820 can include descriptors that reference data or packets in transmit queue 806 or receive queue 808. Bus interface 812 can provide an interface with host device (not depicted). For example, bus interface 812 can be compatible with PCI, PCI Express, PCI-x, Serial ATA, and/or USB compatible interface (although other interconnection standards may be used).

Figure 8B:
FIG. 8B depicts an example switch.
Figure 8B:
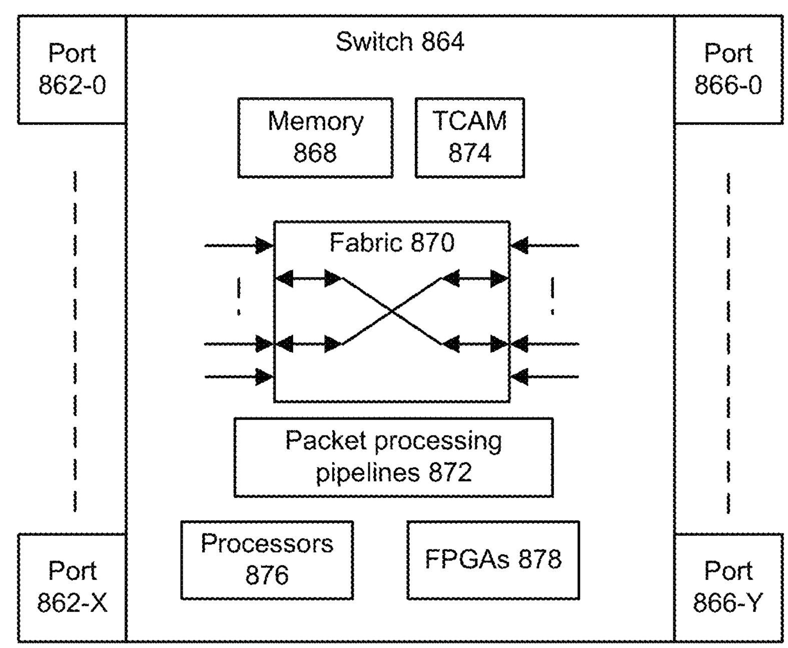

FIG. 8B depicts an example switch. Various examples can be used in or with the switch to perform packet replication, packet broadcast or multicast, track receipt of packets, and indicate acknowledgement of receipt to a sender network interface device, as described herein. Switch can receive a single packet from the source and sends one copy to each one of the recipients. Switch 864 can route packets or frames of any format or in accordance with any specification from any port 862-0 to 862-X to any of ports 866-0 to 866-Y (or vice versa). Any of ports 862-0 to 862-X can be connected to a network of one or more interconnected devices. Similarly, any of ports 866-0 to 866-Y can be connected to a network of one or more interconnected devices.

In some examples, switch fabric 870 can provide routing of packets from one or more ingress ports for processing prior to egress from switch 864. Switch fabric 870 can be implemented as one or more multi-hop topologies, where example topologies include torus, butterflies, buffered multi-stage, etc., or shared memory switch fabric (SMSF), among other implementations. SMSF can be any switch fabric connected to ingress ports and all egress ports in the switch, where ingress subsystems write (store) packet segments into the fabric's memory, while the egress subsystems read (fetch) packet segments from the fabric's memory.

Memory 868 can be configured to store packets received at ports prior to egress from one or more ports. Packet processing pipelines 872 can determine which port to transfer packets or frames to using a table that maps packet characteristics with an associated output port. Packet processing pipelines 872 can be configured to perform match-action on received packets to identify packet processing rules and next hops using information stored in a ternary content-addressable memory (TCAM) tables or exact match tables in some embodiments. For example, match-action tables or circuitry can be used whereby a hash of a portion of a packet is used as an index to find an entry. Packet processing pipelines 872 can implement access control list (ACL) or packet drops due to queue overflow. Packet processing pipelines 872 can be configured to perform packet replication, packet broadcast or multicast, track receipt of packets, and indicate acknowledgement of receipt to a sender network interface device, as described herein.

Configuration of operation of packet processing pipelines 872, including its data plane, can be programmed using example programming languages and manners described herein. Processors 876 and FPGAs 878 can be utilized for packet processing or modification.

Figure 9:
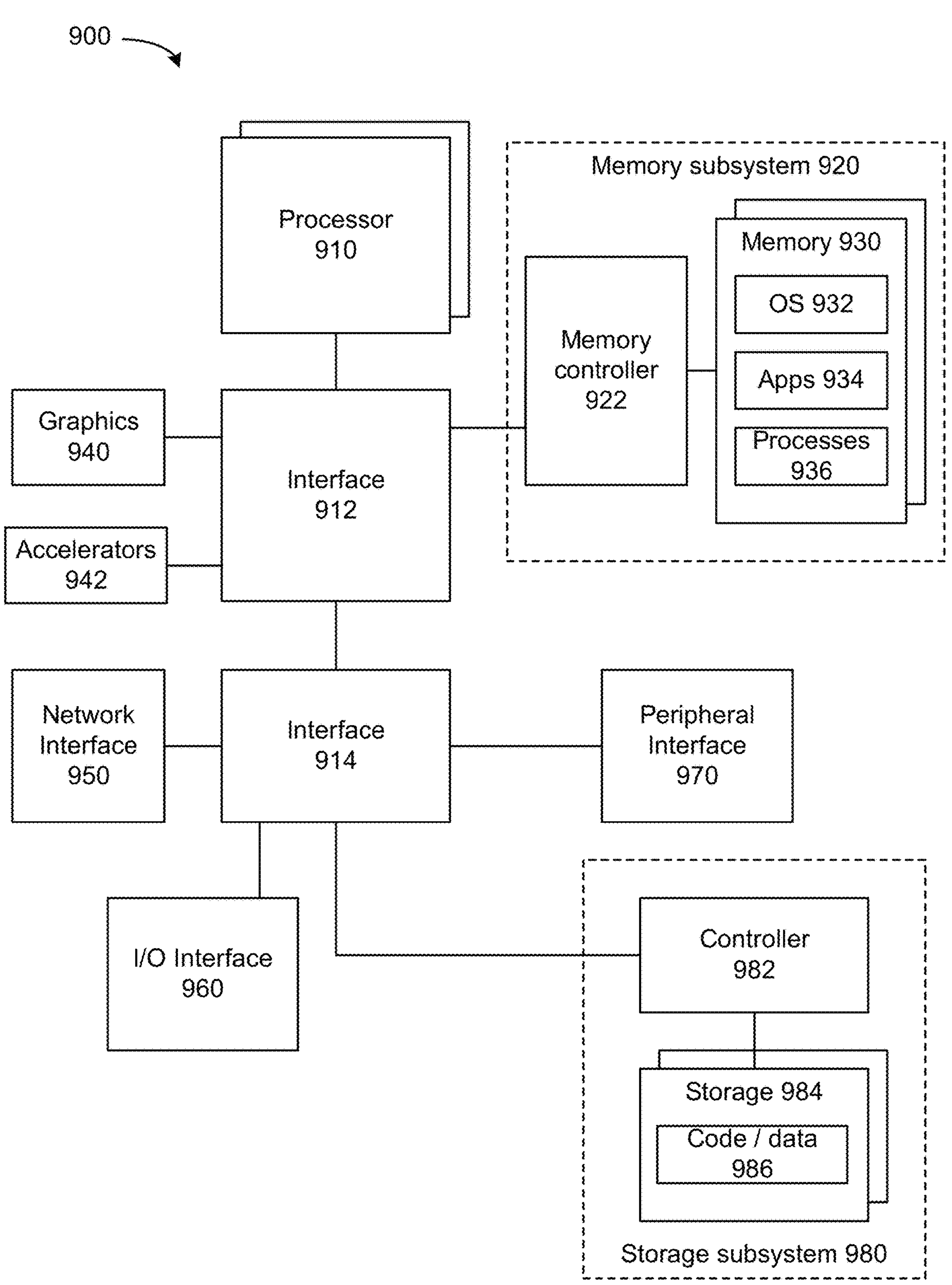
FIG. 9 depicts an example computing system.

FIG. 9 depicts an example computing system. Components of system 900 (e.g., processor 910, network interface 950, and so forth) at least to broadcast packets to a switch that provide tracking of packet receipt, as described herein. System 900 includes processor 910, which provides processing, operation management, and execution of instructions for system 900. Processor 910 can include any type of microprocessor, central processing unit (CPU), graphics processing unit (GPU), processing core, or other processing hardware to provide processing for system 900, or a combination of processors. Processor 910 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 900 includes interface 912 coupled to processor 910, which can represent a higher speed interface or a high throughput interface for system components that needs higher bandwidth connections, such as memory subsystem 920 or graphics interface components 940, or accelerators 942. Interface 912 represents an interface circuit, which can be a standalone component or integrated onto a processor die. Where present, graphics interface 940 interfaces to graphics components for providing a visual display to a user of system 900. In one example, graphics interface 940 can drive a high definition (HD)

display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 940 generates a display based on data stored in memory 930 or based on operations executed by processor 910 or both. In one example, graphics interface 940 generates a display based on data stored in memory 930 or based on operations executed by processor 910 or both.

Accelerators 942 can be a fixed function or programmable offload engine that can be accessed or used by a processor 910. For example, an accelerator among accelerators 942 can provide compression (DC) capability, cryptography services such as public key encryption (PKE), cipher, hash/authentication capabilities, decryption, or other capabilities or services. In some embodiments, in addition or alternatively, an accelerator among accelerators 942 provides field select controller capabilities as described herein. In some cases, accelerators 942 can be integrated into a CPU socket (e.g., a connector to a motherboard or circuit board that includes a CPU and provides an electrical interface with the CPU). For example, accelerators 942 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 942 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 920 represents the main memory of system 900 and provides storage for code to be executed by processor 910, or data values to be used in executing a routine. Memory subsystem 920 can include one or more memory devices 930 such as read-only memory (ROM), flash memory, one or more varieties of random access memory (RAM) such as DRAM, or other memory devices, or a combination of such devices. Memory 930 stores and hosts, among other things, operating system (OS) 932 to provide a software platform for execution of instructions in system 900. Additionally, applications 934 can execute on the software platform of OS 932 from memory 930. Applications 934 represent programs that have their own operational logic to perform execution of one or more functions. Processes 936 represent agents or routines that provide auxiliary functions to OS 932 or one or more applications 934 or a combination. OS 932, applications 934, and processes 936 provide software logic to provide functions for system 900. In one example, memory subsystem 920 includes memory controller 922, which is a memory controller to generate and issue commands to memory 930. It will be understood that memory controller 922 could be a physical part of processor 910 or a physical part of interface 912. For example, memory controller 922 can be an integrated memory controller, integrated onto a circuit with processor 910.

Applications 934 and/or processes 936 can refer instead or additionally to a virtual machine (VM), container, microservice, processor, or other software. Various examples described herein can perform an application composed of microservices, where a microservice runs in its own process and communicates using protocols (e.g., application program interface (API), a Hypertext Transfer Protocol (HTTP) resource API, message service, remote procedure calls (RPC), or Google RPC (gRPC)). Microservices can communicate with one another using a service mesh and be executed in one or more data centers or edge networks. Microservices can be independently deployed using centralized management of these services. The management system may be written in different programming languages and use different data storage technologies. A microservice can be characterized by one or more of: polyglot programming (e.g., code written in multiple languages to capture additional functionality and efficiency not available in a single language), or lightweight container or virtual machine deployment, and decentralized continuous microservice delivery.

A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can include an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from another, allowing virtual machines to run Linux®, Windows® Server, VMware ESXi, and other operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers may be isolated from the other software and the operating system itself. The isolated nature of containers provides several benefits. First, the software in a container will run the same in different environments. For example, a container that includes PHP and MySQL can run identically on both a Linux® computer and a Windows® machine. Second, containers provide added security since the software will not affect the host operating system. While an installed application may alter system settings and modify resources, such as the Windows registry, a container can only modify settings within the container.

In some examples, OS 932 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Nvidia®, Broadcom®, Texas Instruments®, among others. In some examples, a driver can configure network interface 950 to identify a packet for transmission to multiple destination devices by a switch, indicate that a switch can reuse a data structure that tracks acknowledgements of receipt, and/or re-transmit a packet based on lack of acknowledgement of receipt from the switch, as described herein. In some examples, a driver can enable or disable offload to network interface 950 to identify a packet for transmission to multiple destination devices by a switch, indicate that a switch can reuse a data structure that tracks acknowledgements of receipt, and/or re-transmit a packet based on lack of acknowledgement of receipt from the switch, as described herein. A driver can advertise capability to processes that network interface 950 can identify a packet for transmission to multiple destination devices by a switch, indicate that a switch can reuse a data structure that tracks acknowledgements of receipt, and/or re-transmit a packet based on lack of acknowledgement of receipt from the switch, as described herein.

While not specifically illustrated, it will be understood that system 900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 900 includes interface 914, which can be coupled to interface 912. In one example, interface 914 represents an interface circuit, which can include standalone components and integrated circuitry. In one example, multiple user interface components or peripheral components, or both, couple to interface 914. Network interface 950 provides system 900 the ability to communicate with remote devices (e.g., servers or other computing devices) over one or more networks. Network interface 950 can include an Ethernet adapter, wireless interconnection components, cellular network interconnection components, USB (universal serial bus), or other wired or wireless standards-based or proprietary interfaces. Network interface 950 can transmit data to a device that is in the same data center or rack or a remote device, which can include sending data stored in memory.

Some examples of network interface 950 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 900 includes one or more input/output (I/O) interface(s) 960. I/O interface 960 can include one or more interface components through which a user interacts with system 900 (e.g., audio, alphanumeric, tactile/touch, or other interfacing). Peripheral interface 970 can include any hardware interface not specifically mentioned above. Peripherals refer generally to devices that connect dependently to system 900. A dependent connection is one where system 900 provides the software platform or hardware platform or both on which operation executes, and with which a user interacts.

In one example, system 900 includes storage subsystem 980 to store data in a nonvolatile manner. In one example, in certain system implementations, at least certain components of storage 980 can overlap with components of memory subsystem 920. Storage subsystem 980 includes storage device(s) 984, which can be or include any conventional medium for storing large amounts of data in a nonvolatile manner, such as one or more magnetic, solid state, or optical based disks, or a combination. Storage 984 holds code or instructions and data 986 in a persistent state (e.g., the value is retained despite interruption of power to system 900). Storage 984 can be generically considered to be a "memory," although memory 930 is typically the executing or operating memory to provide instructions to processor 910. Whereas storage 984 is nonvolatile, memory 930 can include volatile memory (e.g., the value or state of the data is indeterminate if power is interrupted to system 900). In one example, storage subsystem 980 includes controller 982 to interface with storage 984. In one example controller 982 is a physical part of interface 914 or processor 910 or can include circuits or logic in both processor 910 and interface 914.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache.

A non-volatile memory (NVM) device is a memory whose state is determinate even if power is interrupted to the device. In one embodiment, the NVM device can comprise a block addressable memory device, such as NAND technologies. A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 900. More specifically, power source typically interfaces to one or multiple power supplies in system 900 to provide power to the components of system 900. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 900 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Examples herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade can include components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, edge servers, edge switches, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, system-on-chip (SoC), and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or combination thereof, including "X, Y, and/or Z."

Illustrative examples of the devices, systems, and methods disclosed herein are provided below. An embodiment of the devices, systems, and methods may include one or more, and combination of, the examples described below.

Example 1 includes one or more examples and an apparatus comprising: a switch circuitry comprising: circuitry to cause transmission, to multiple destinations, of copies of a packet received from a sender network interface device and circuitry to indicate acknowledgement of packet receipt, from the multiple destinations, to the sender network interface device based on receipt of acknowledgements of packet receipt from the multiple destinations.

Example 2 includes one or more examples, wherein circuitry to indicate acknowledgement of packet receipt, from the multiple destinations, to the sender network interface device with a packet index value.

Example 3 includes one or more examples, wherein the switch circuitry comprises circuitry to identify acknowledgement of packet receipt from at least one of the multiple destinations based on use of a data structure.

Example 4 includes one or more examples, wherein the switch circuitry comprises circuitry to re-transmit the acknowledgement of packet receipt to the sender network interface device based on an indication of non-receipt of the acknowledgement of packet receipt from the sender network interface device.

Example 5 includes one or more examples, wherein the switch circuitry comprises circuitry to transmit the packet to the multiple destinations in association with a broadcast, multicast, Allgather, or Allreduce operation.

Example 6 includes one or more examples, wherein the switch circuitry comprises one or more ports from which to transmit the packet or receive a second packet.

Example 7 includes one or more examples, and includes the sender network interface device and a server, wherein the server is to cause transmission of the packet to the multiple destinations and the sender network interface device is to cause the switch circuitry to transmit the packet to the multiple destinations.

Example 8 includes one or more examples, and includes a data center, wherein the data center comprises the multiple destinations and wherein at least one of the multiple destinations comprises a receiver network interface device.

Example 9 includes one or more examples, and includes a non-transitory computer-readable medium comprising instructions, that if executed by one or more processors, cause the one or more processors to: configure a network interface device to request a switch to transmit content of packet to multiple destinations and, based on a single acknowledgement message, identify acknowledgement of receipt of the content of the packet by the multiple destinations.

Example 10 includes one or more examples, wherein the single acknowledgement message includes an indication of a packet index value associated with the packet.

Example 11 includes one or more examples, and includes instructions, that if executed by one or more processors, cause the one or more processors to: configure the network interface device to re-transmit the content of the packet to the switch based on not receiving, from the switch, an acknowledgement of receipt of the content of the packet from the multiple destinations.

Example 12 includes one or more examples, and includes a non-transitory computer-readable medium comprising instructions, that if executed by one or more processors, cause the one or more processors to: configure a switch circuitry to cause transmission, to multiple destinations, of copies of a packet received from a sender network interface device and indicate acknowledgement of packet receipt, from the multiple destinations, to the sender network interface device based on receipt of acknowledgements of packet receipt from the multiple destinations.

Example 13 includes one or more examples, wherein the acknowledgement of packet receipt, from the multiple destinations, to the sender network interface device includes a packet index value.

Example 14 includes one or more examples, and includes instructions, that if executed by one or more processors, cause the one or more processors to: configure the switch circuitry to identify acknowledgement of packet receipt from at least one of the multiple destinations based on use of a data structure.

Example 15 includes one or more examples, and includes instructions, that if executed by one or more processors, cause the one or more processors to: configure the switch circuitry to re-transmit the acknowledgement of packet receipt to the sender network interface device based on an indication of non-receipt of the acknowledgement of packet receipt from the sender network interface device.

Example 16 includes one or more examples, wherein the transmission of the packet to the multiple destinations is associated with a broadcast, multicast, Allgather, or Allreduce operation.

Example 17 includes one or more examples, and includes a method that includes: a switch causing transmission of multiple copies to multiple destinations of a packet received from a sender network interface device and the switch indicating acknowledgement of packet receipt, from the multiple destinations, to the sender network interface device in a single acknowledgement.

Example 18 includes one or more examples, wherein the single acknowledgement includes a packet index value.

Example 19 includes one or more examples, and includes the switch identifying acknowledgement of packet receipt from at least one of the multiple destinations based on use of a data structure.

Example 20 includes one or more examples, and includes re-transmitting the single acknowledgement to the sender network interface device based on an indication of non-receipt of the single acknowledgement from the sender network interface device.

The invention claimed is:

1. An apparatus comprising:

a switch circuitry comprising:

circuitry to cause transmission, to multiple destinations, of copies of a packet received from a sender network interface device, wherein the transmission of the copies of the packet to the multiple destinations is associated with a broadcast, multicast, Allgather, or Allreduce operation and circuitry to:

based on receipt of acknowledgements of packet receipt from all of the multiple destinations, send a single acknowledgement of multicast packet receipt, on behalf of the multiple destinations, to the sender network interface device, re-transmit the single acknowledgement of packet receipt from the multiple destinations to the sender network interface device based on non-receipt of the single acknowledgement of packet receipt by the sender network interface device, and based on non-receipt of a packet by a destination of the multiple destinations, indicate non-receipt of the packet to the sender network interface device, receive a re-transmitted packet from the sender network interface device, and transmit the re-transmitted packet to the destination of the multiple destinations.

2. The apparatus of claim 1, wherein the circuitry is to indicate acknowledgement of packet receipt, from the multiple destinations, to the sender network interface device with a packet index value and wherein the packet index value is to indicate a destination that received the packet.

3. The apparatus of claim 1, wherein the switch circuitry comprises circuitry to identify acknowledgement of packet receipt from at least one of the multiple destinations based on use of a data structure that tracks receipt of the packet for a particular transmission of the packet to the multiple destinations.

4. The apparatus of claim 1, wherein the switch circuitry comprises one or more ports from which to transmit the packet or receive a second packet.

5. The apparatus of claim 1, comprising the sender network interface device and a server, wherein the server is to cause transmission of the packet to the multiple destinations and the sender network interface device is to cause the switch circuitry to transmit the packet to the multiple destinations.

6. The apparatus of claim 5, further comprising a data center, wherein the data center comprises the multiple destinations and wherein at least one of the multiple destinations comprises a receiver network interface device.

7. The apparatus of claim 1, wherein to re-transmit the single acknowledgement of packet receipt from the multiple destinations to the sender network interface device, the switch circuitry is to indicate an associated multicast or broadcast group in the re-transmitted single acknowledgement to identify the multiple destinations.

8. At least one non-transitory computer-readable medium comprising instructions, that if executed by one or more processors, cause the one or more processors to:

configure a network interface device to:

request a switch to:

(1) transmit content of packet to multiple destinations, wherein the transmit content of the packet to the multiple destinations is associated with a broadcast, multicast, Allgather, or Allreduce operation; (2) send a single acknowledgement message of receipt of the packet by the multiple destinations to the network interface device, and, based on the single acknowledgement message, identify acknowledgement of receipt of the content of the packet by the multiple destinations to the network interface device; and (3) re-transmit the single acknowledgement of packet receipt to the network interface device based on non-receipt of the single acknowledgement of packet receipt by the network interface device and based on not receiving, from the switch, the single acknowledgement message of receipt of the content of the packet from the multiple destinations, re-transmit the content of the packet to the switch and cause the switch to re-transmit the content to a destination of the multiple destinations from which an acknowledgment of receipt was not received by the switch.

9. The non-transitory computer-readable medium of claim 8, wherein the single acknowledgement message includes an indication of a destination that received the packet.

10. At least one non-transitory computer-readable medium comprising instructions, that if executed by one or more processors, cause the one or more processors to:

configure a switch circuitry to cause transmission, to multiple destinations, of copies of a packet received from a sender network interface device, wherein the transmission of the copies of the packet to the multiple destinations is associated with a broadcast, multicast, Allgather, or Allreduce operation;

based on receipt of acknowledgements of packet receipt from the multiple destinations, send a single acknowledgement of packet receipt, on behalf of the multiple destinations, to the sender network interface device;

re-transmit the single acknowledgement of packet receipt from the multiple destinations to the sender network interface device based on an indication of non-receipt of the acknowledgement of packet receipt by the sender network interface device; and based on non-receipt of a packet by a destination of the multiple destinations, indicate non-receipt of the packet to the sender network interface device, receive a re-transmitted packet from the sender network interface device, and transmit the re-transmitted packet to the destination of the multiple destinations.

11. The non-transitory computer-readable medium of claim 10, wherein the single acknowledgement of packet receipt, from the multiple destinations, to the sender network interface device indicates at least one destination that received the packet.

12. The non-transitory computer-readable medium of claim 10, comprising instructions, that if executed by one or more processors, cause the one or more processors to:

configure the switch circuitry to identify acknowledgement of packet receipt from at least one of the multiple destinations based on use of a data structure that tracks receipt of the packet for a particular transmission of the packet to the multiple destinations.

13. A method comprising:

a switch causing transmission of multiple copies of a packet received from a sender network interface device to multiple destinations, wherein the transmission of copies of the packet to the multiple destinations is associated with a broadcast, multicast, Allgather, or Allreduce operation;

based on receipt of acknowledgements of packet receipt from the multiple destinations, the switch sending a single acknowledgement of packet receipt, on behalf of the multiple destinations, to the sender network interface device;

based on an indication of non-receipt of the single acknowledgement from the sender network interface device, the switch re-transmitting the single acknowledgement to the sender network interface device; and based on non-receipt of a packet by a destination of the multiple destinations, the switch performing: indicating non-receipt to the sender network interface device, receiving a re-transmitted packet from the sender network interface device, and transmitting the re-transmitted packet to the destination of the multiple destinations.

14. The method of claim 13, wherein the single acknowledgement includes an indication of at least one destination that received the packet.

15. The method of claim 13, comprising:

the switch identifying acknowledgement of packet receipt from at least one of the multiple destinations based on use of a data structure that tracks receipt of the packet for a particular transmission of the packet to the multiple destinations.

16. The method of claim 13, comprising:

the switch receiving the packet with an index value in a header of the packet, wherein the index value identifies a multicast group comprising the multiple destinations and the switch determining whether the packet is a re-transmitted packet based on the index value.

17. The method of claim 13, comprising:

the switch causing transmission of multiple copies of a second packet received from the sender network interface device to a second group of multiple destinations;

the switch tracking receipt of acknowledgements from the second group of multiple destinations in a data structure formerly used to track acknowledgements received from the multiple destinations; and based on receipt of acknowledgements of receipt of the copies of the second packet from the second group of multiple destinations, the switch sending a second single acknowledgement of packet receipt, on behalf of the second group of multiple destinations, to the sender network interface device.

* * * * *